(12) United States Patent
Baxter et al.

(10) Patent No.: US 8,955,896 B2
(45) Date of Patent: Feb. 17, 2015

(54) TRI-EXTRUDED ROOF DITCH MOLDING WITH HARD AND SOFT COMPONENTS INCLUDING ASSOCIATED FASTENER SYSTEM AND METHOD FOR HEAT FORMING THE ROOF DITCH MOLDING

(71) Applicant: U.S. Farathane Corporation, Auburn Hills, MI (US)

(72) Inventors: Kevin Charles Baxter, Goodrich, MI (US); Wayne Bland, Fort Gratiot, MI (US); Steve Porter, Romeo, MI (US)

(73) Assignee: U.S. Farathane Corporation, Auburn Hills, MI (US)

( * ) Notice: Subject to any disclaimer, the term of this patent is extended or adjusted under 35 U.S.C. 154(b) by 0 days.

(21) Appl. No.: 14/075,654

(22) Filed: Nov. 8, 2013

(65) Prior Publication Data

US 2014/0062117 A1     Mar. 6, 2014

Related U.S. Application Data

(63) Continuation-in-part of application No. 13/794,073, filed on Mar. 11, 2013, now Pat. No. 8,783,751.

(60) Provisional application No. 61/669,732, filed on Jul. 10, 2012.

(51) Int. Cl.
*B60R 13/04* (2006.01)
*B29C 47/00* (2006.01)
*B60J 10/00* (2006.01)

(52) U.S. Cl.
CPC ............. *B60R 13/04* (2013.01); *B29C 47/0066* (2013.01); *B60J 10/0062* (2013.01); *B60J 10/008* (2013.01)
USPC ............ 296/1.08; 296/93; 296/213; 52/716.6

(58) Field of Classification Search
USPC .............. 296/1.08, 93, 95.1, 146.9, 210, 213; 428/31; 52/716.5, 716.6
See application file for complete search history.

(56) References Cited

U.S. PATENT DOCUMENTS

| 5,013,083 A | 5/1991 | Yada et al. |
| 5,368,903 A | 11/1994 | Trier |

(Continued)

FOREIGN PATENT DOCUMENTS

| EP | 386986 A1 | 9/1990 |
| EP | 0857615 A1 | 8/1998 |

(Continued)

*Primary Examiner* — Glenn Dayoan
*Assistant Examiner* — Jason S Daniels
(74) *Attorney, Agent, or Firm* — Gifford, Krass, Sprinkle, Anderson & Citkowski, P.C.; Douglas J. McEvoy

(57) ABSTRACT

A tri-extruded molding for mounting within a vehicle roof ditch. The tri-extruded molding is produced as an elongated trim defining component and is constructed of a rigid substrate material, a first UV graded thermoplastic elastomer applied over the exterior of the rigid substrate, with a second thermoplastic elastomer formed as a pair of laterally projecting wings along exterior and outwardly opposite edges of the rigid substrate and in communicating fashion with the jointly extruded edges of the first thermoplastic elastomer. A plurality of fasteners are seated within the track for mounting the molding to the vehicle roof ditch. A single production line process is disclosed for tri-extruding the three components into a roof ditch molding and includes a handling operation with opposing dies surfaces for compressing therebetween an initial straight length of extrusion for forming into a desired final shape.

14 Claims, 10 Drawing Sheets

(56) References Cited

U.S. PATENT DOCUMENTS

| | | |
|---|---|---|
| 6,210,615 B1 | 4/2001 | Yoshizuru et al. |
| 6,224,145 B1 | 5/2001 | Sugiura |
| 6,684,574 B2 | 2/2004 | Hayashi |
| 6,974,181 B2 | 12/2005 | Mikkaichi et al. |
| 7,004,535 B1 | 2/2006 | Osterberg et al. |
| 7,004,537 B2 | 2/2006 | Unger et al. |
| 7,029,060 B1 | 4/2006 | Osterberg et al. |
| 7,045,189 B2 | 5/2006 | Hui et al. |
| 7,401,395 B2 | 7/2008 | Unger et al. |
| 7,604,287 B2 | 10/2009 | Mourou |
| 7,621,574 B2 | 11/2009 | Mourou et al. |
| 7,837,257 B2 | 11/2010 | Kuntze et al. |
| 8,070,204 B2 | 12/2011 | Mourou |
| 2006/0052538 A1* | 3/2006 | Ellul et al. .................. 525/191 |
| 2007/0182214 A1 | 8/2007 | Okabe et al. |
| 2008/0277973 A1 | 11/2008 | Mourou |
| 2009/0021053 A1 | 1/2009 | Harberts et al. |
| 2009/0102241 A1 | 4/2009 | Harberts et al. |
| 2010/0180536 A1 | 7/2010 | Reznar |
| 2010/0196629 A1 | 8/2010 | Mourou et al. |
| 2011/0010898 A1 | 1/2011 | Scroggie et al. |
| 2011/0204671 A1* | 8/2011 | Baratin .......................... 296/93 |
| 2012/0068488 A1 | 3/2012 | Mourou |
| 2013/0234474 A1 | 9/2013 | Coakley et al. |

FOREIGN PATENT DOCUMENTS

| | | |
|---|---|---|
| JP | 09150683 A | 6/1997 |
| JP | 2003040042 A | 2/2003 |
| JP | 2003182466 A | 7/2003 |
| JP | 2007302171 A | 11/2007 |
| JP | 2010501384 A | 1/2010 |
| JP | 4722765 B2 | 7/2011 |

* cited by examiner

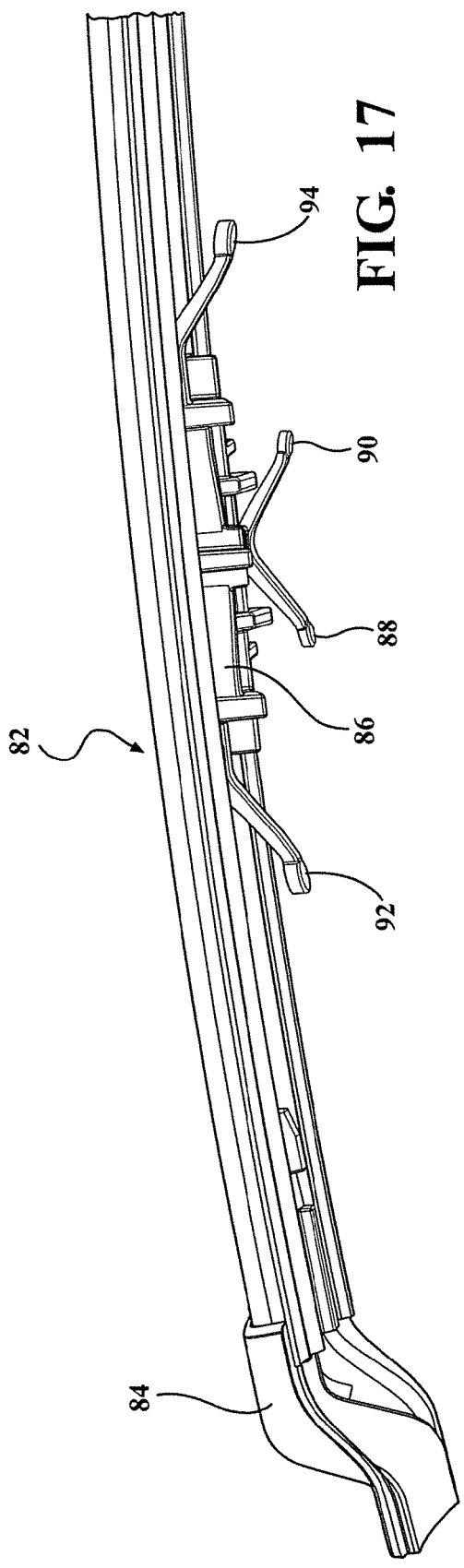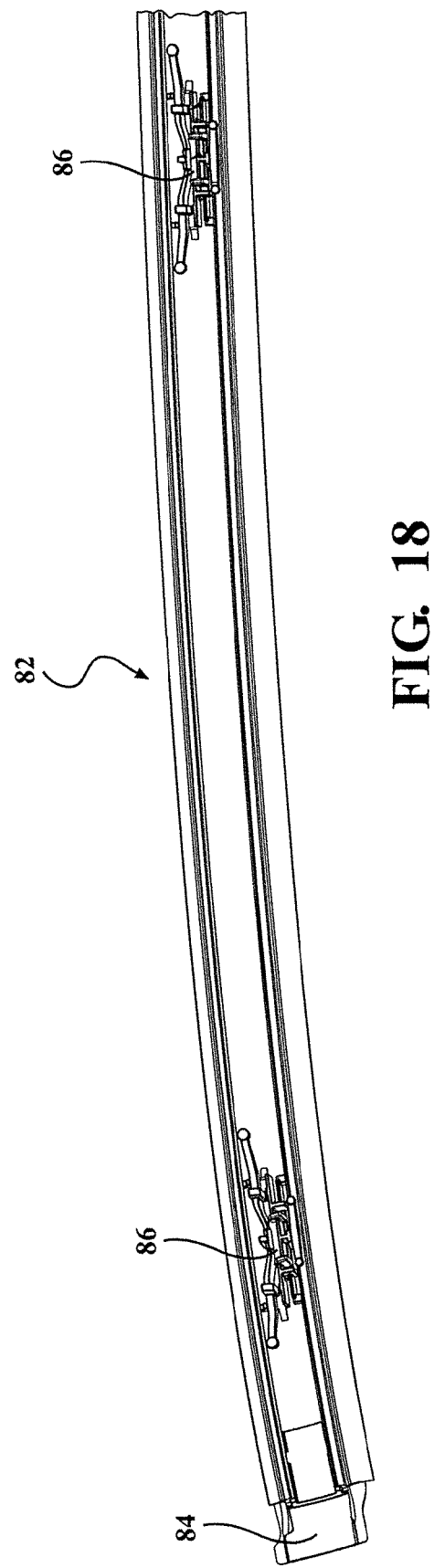

TRI-EXTRUDED ROOF DITCH MOLDING WITH HARD AND SOFT COMPONENTS INCLUDING ASSOCIATED FASTENER SYSTEM AND METHOD FOR HEAT FORMING THE ROOF DITCH MOLDING

CROSS-REFERENCE TO RELATED APPLICATIONS

This application is a Continuation-in-part of U.S. application Ser. No. 13/794,073 filed on Mar. 11, 2013. Application U.S. Ser. No. 13/794,073 claims the benefit of U.S. Provisional Application 61/669,732 filed on Jul. 10, 2012, the contents of which are incorporated herein in their entirety.

FIELD OF THE INVENTION

The present invention is a tri-extruded molding for mounting within a vehicle roof ditch. The tri-extruded molding is produced as an elongated trim defining component and is constructed of a rigid substrate material, a first UV graded thermoplastic elastomer applied over the exterior of the rigid substrate, with a second thermoplastic elastomer formed as a pair of laterally projecting wings along exterior and outwardly opposite edges of the rigid substrate and in communicating fashion with the jointly extruded edges of the first thermoplastic elastomer. A plurality of fasteners seat within the track for mounting the molding to the vehicle roof ditch. A single production line process is disclosed for tri-extruding the three components into a roof ditch molding. The tri-extruded article and associated forming process enables the production of a 100% thermoplastic design exhibiting desired surface coloration and appearance and which replaces conventional metal or metal coated roof ditch moldings.

BACKGROUND OF THE INVENTION

Vehicle roof ditch moldings are known in the art, one example of which is set forth in U.S. Pat. No. 7,621,574, issued to Mourou et al. and which teaches a vehicle ditch molding for insertion and retention in a vehicle roof ditch recess. Features associated with the molding include a head extending outward from a ditch molding centerline and which is configured to cover an opening to the recess.

A stem extends from the head along the centerline and is configured to be narrower than the opening to the recess. A pair of wings extend outward from the stem in opposed directions relative to the ditch molding centerline. Each of the wings has an upper surface facing the head and an opposed lower surface, as well as each having a wing lower notch extending into the wing lower surface and defining an inner living hinge extending between the respective wing lower notch and corresponding upper surface.

US 2012/0068488, also to Mourou, teaches a retaining clip for a ditch molding having a head with left and right wings that lap onto the roof. A stem depends from the head and an enlarged foot is located at a lower end of the stem. A molding clip includes a base mounted in the ditch and left and right biasing arms having wedge faces that engage with the foot to urge the foot downwardly into the ditch in an installed position of the molding.

The left and right biasing arms yield away from each other upon an upward movement of the foot. Left and right trap arms are also provided on the clip and have trap ends overlying the foot of the molding in spaced relation therefrom when the molding is in the installed position. Upward movement of the foot causes the foot to engage with the trap ends of the trap arms, trapping the foot against further upward movement.

A further example of a simplified end formed roof ditch molding is depicted in Mourou 2008/0277973 and including a main molding member having a head and an integrally formed beam. The end sections of the beam are removed and the head is contoured and provided with a notch. The end sections are then placed into a plastic injection molding machine whereat the head is folded at the notch, with a shot of plastic deposited adjacent the notch for retention of the fold angle and stiffening of the now formed end caps. A pair of nibs provide engagement with the spring clips at the ends of the roof ditch.

Another design of note is set forth in Hui U.S. Pat. No. 7,045,189 which teaches an automotive molding for closing a recess between a pair of body panels and including a head portion, a stem portion and at least one leg member. The head portion exhibits a width sufficient to close the opening when the molding is installed in the recess. The stem portion can further be formed of a harder plastic material then the leg member and exhibits a width enabling the stem portion to pass through an opening in the recess. The leg member is formed of a softer material and extends from the stem portion for frictional engagement with the side wall of the recess. A living hinge can be formed in the leg member to facilitate deflection of the leg member during insertion.

SUMMARY OF THE INVENTION

The present invention discloses a tri-extruded molding for mounting within a vehicle roof ditch. The tri-extruded molding is produced as an elongated trim defining component and is constructed of a rigid substrate material, a first UV graded thermoplastic elastomer applied over the exterior of the rigid substrate, with a second thermoplastic elastomer formed as a pair of laterally projecting wings along exterior and outwardly opposite edges of the rigid substrate and in communicating fashion with the jointly extruded edges of the first thermoplastic elastomer. A plurality of fasteners seat within the track for mounting the molding to the vehicle roof ditch. A single production line process is disclosed for tri-extruding the three components into a roof ditch molding.

The rigid substrate (structurally supporting) component can be provided, without limitation, as an ultra-fine talc reinforced polypropylene (PP). The substrate exhibits a generally "C" shape terminating at either of inwardly or downwardly angled ends so as to define an extending track, a plurality of fasteners seating within the track for mounting the molding to the vehicle roof ditch.

The elastomer components tri-extruded with the rigid substrate can further exhibit different properties, with each of the first UV graded elastomers capable of exhibiting a high definition color. Other features include application of any film material over exposed surfaces associated with components.

A production line process is disclosed for tri-extruding the three components into a roof ditch molding. This can include incorporating any combination of infrared (IR) heat, superheated or cold air, and modified pressure (such as forming within a vacuum or other pressurized environment within which the tri-extruding process and a succeeding forming/bending step utilizing suitable equipment is located). As previously described, the tri-extruded article and associated forming process enables the production of a 100% thermoplastic design exhibiting desired surface coloration and appearance and which replaces conventional metal or metal coated roof ditch moldings.

BRIEF DESCRIPTION OF THE DRAWINGS

Reference will now be made to the attached drawings, when read in combination with the following detailed description, wherein like reference numerals refer to like parts throughout the several views, and in which:

FIG. 17 is a perspective illustration of an end portion of a completed molding with attached end caps and reconfigured fasteners for mounting into the vehicle roof ditch; and FIG. 18 is a rotated inside view of the roof ditch molding and fastener construction of FIG. 17.

DETAILED DESCRIPTION OF THE PREFERRED EMBODIMENTS

A non-limiting variant of the present invention is a coextruded roof ditch molding, such as which replaces previous stainless steel moldings. The coextruded molding is typically produced as a single continuous extrusion which includes both hard and soft components. Specifically, the molding includes an outer flap exhibiting a softer plastic flap or covering material coextruded in a single shot process with a harder and structural supporting thermoplastic further exhibiting an inwardly facing track or channel. A plurality of mounting fasteners seat within the track and assist in mounting the molding to a conventional vehicle roof ditch recess.

Figure 1:
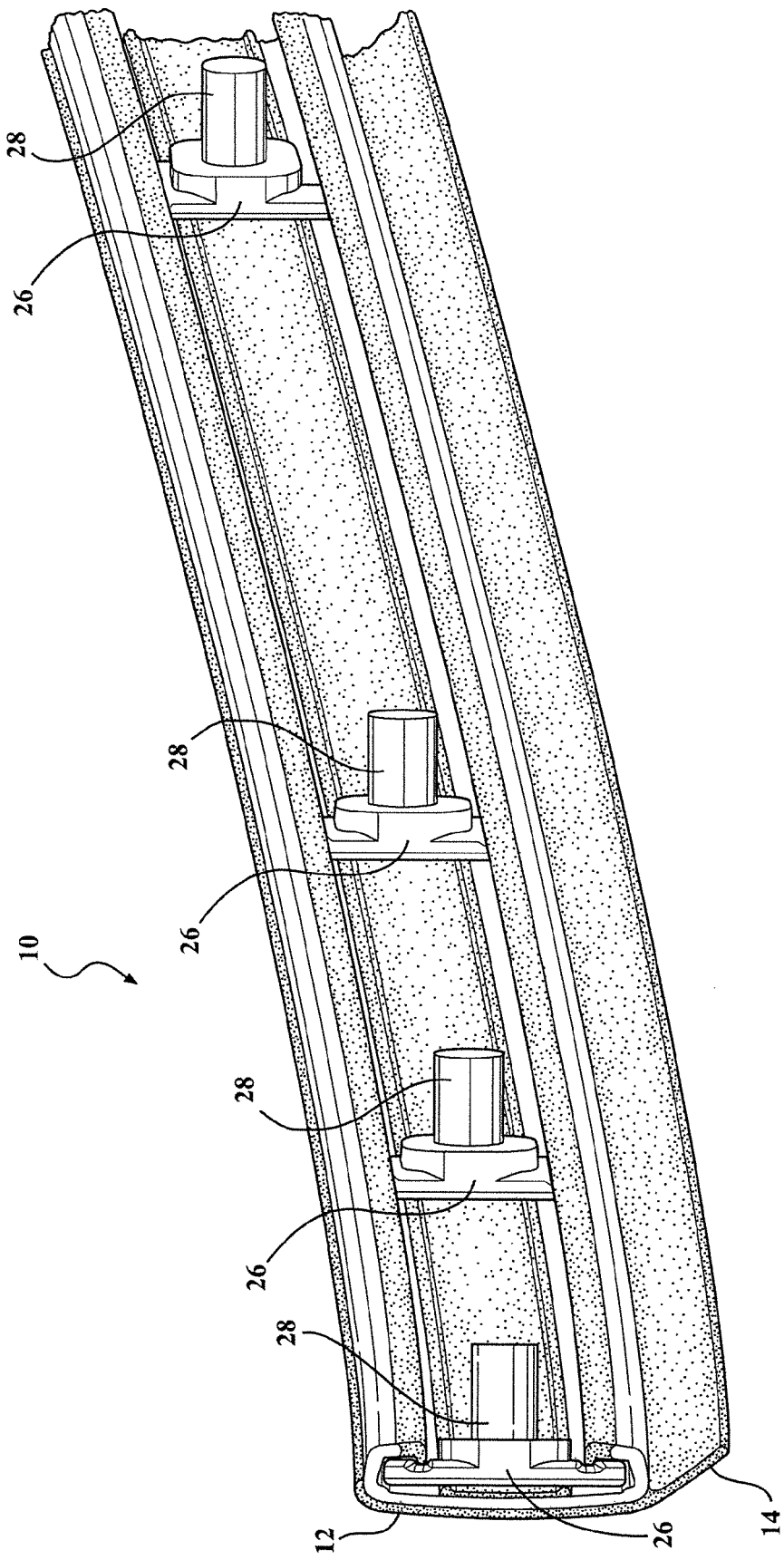
FIG. 1 is a perspective view of a coextruded roof ditch molding according to one non-limiting variant of the present invention.

Referring to FIG. 1, a perspective view is generally shown at 10 of the coextruded roof ditch molding according to one non-limiting variant of the present invention and which depicts a softer and outer/exterior facing material defining a trim piece (exterior facing body) and exhibiting a selected thickness and having an elongated shape consistent with being formed as an extrusion. As further shown, the softer thermoplastic material depicts a generally rectangular shaped profile which, in the example illustrated, includes an elongated body 12 with an interconnected and angled lower lip 14.

Figure 2:
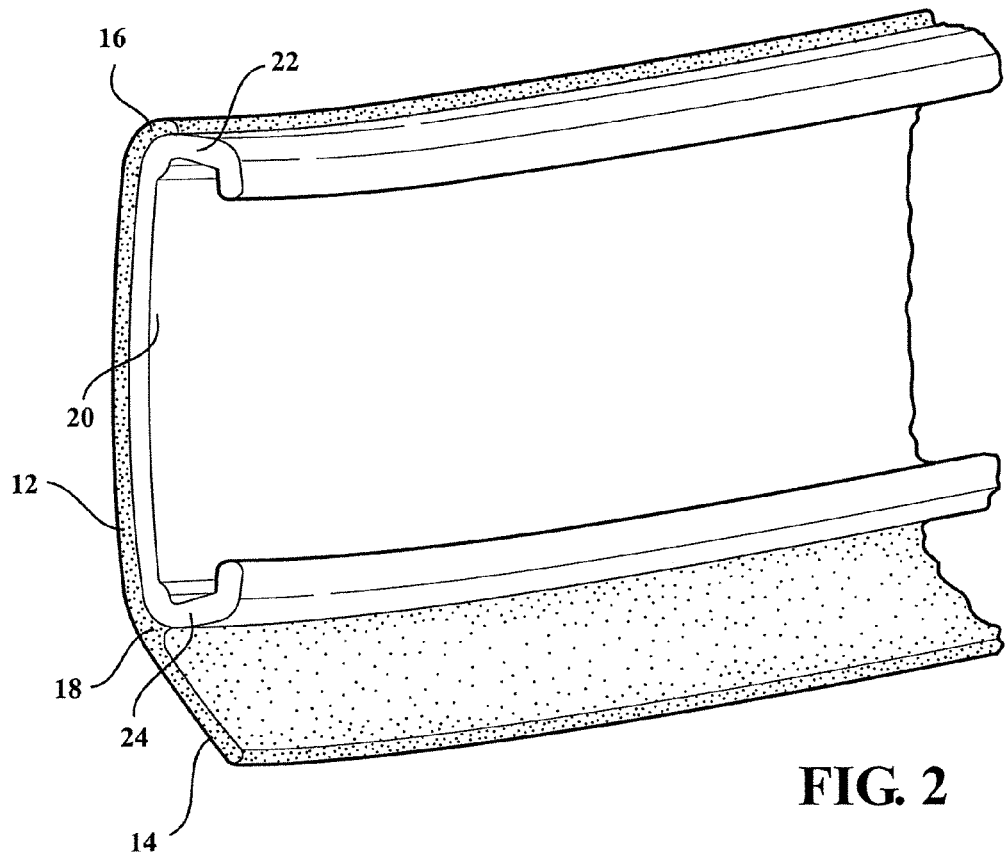
FIG. 2 is an enlarged and rotated view of the coextruded thermoplastic molding depicting the outer/softer flap and inner/structurally supporting channel.
Figure 3:
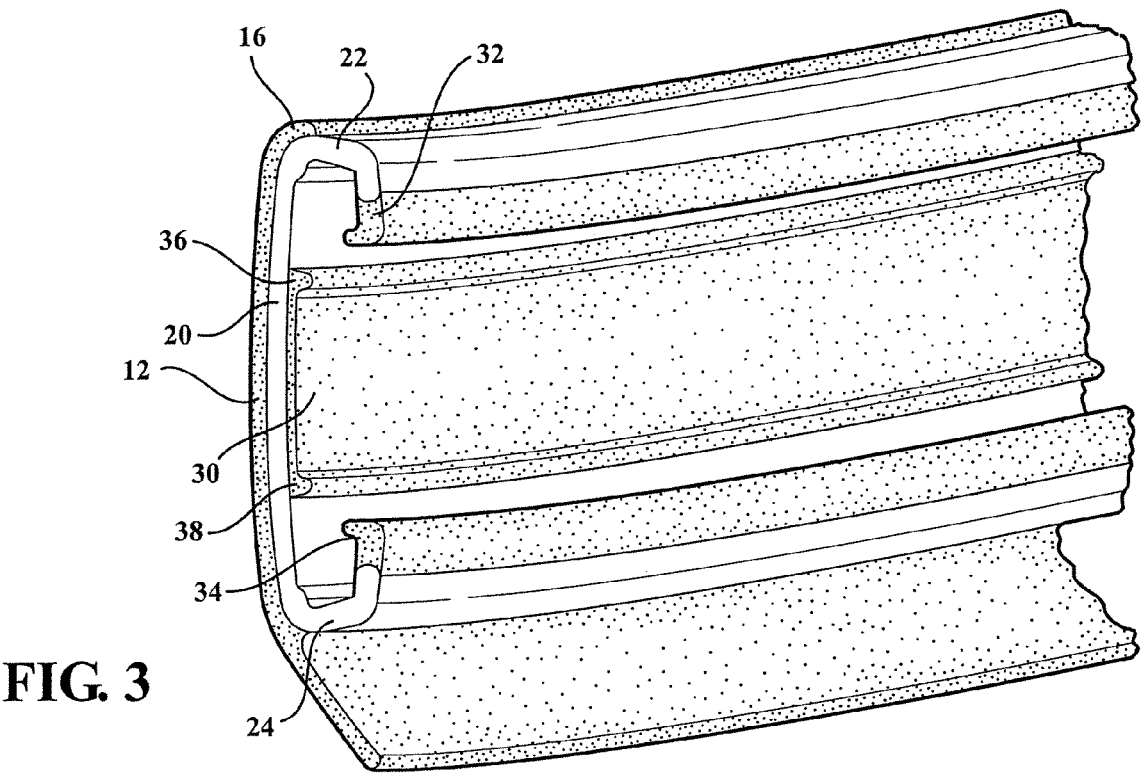
FIG. 3 is a successor view to FIG. 2 and illustrating additional softer plastic components coextruded along both the inside surface and opposing/projecting edges of the track defining harder structural supporting portion.
Figure 5:
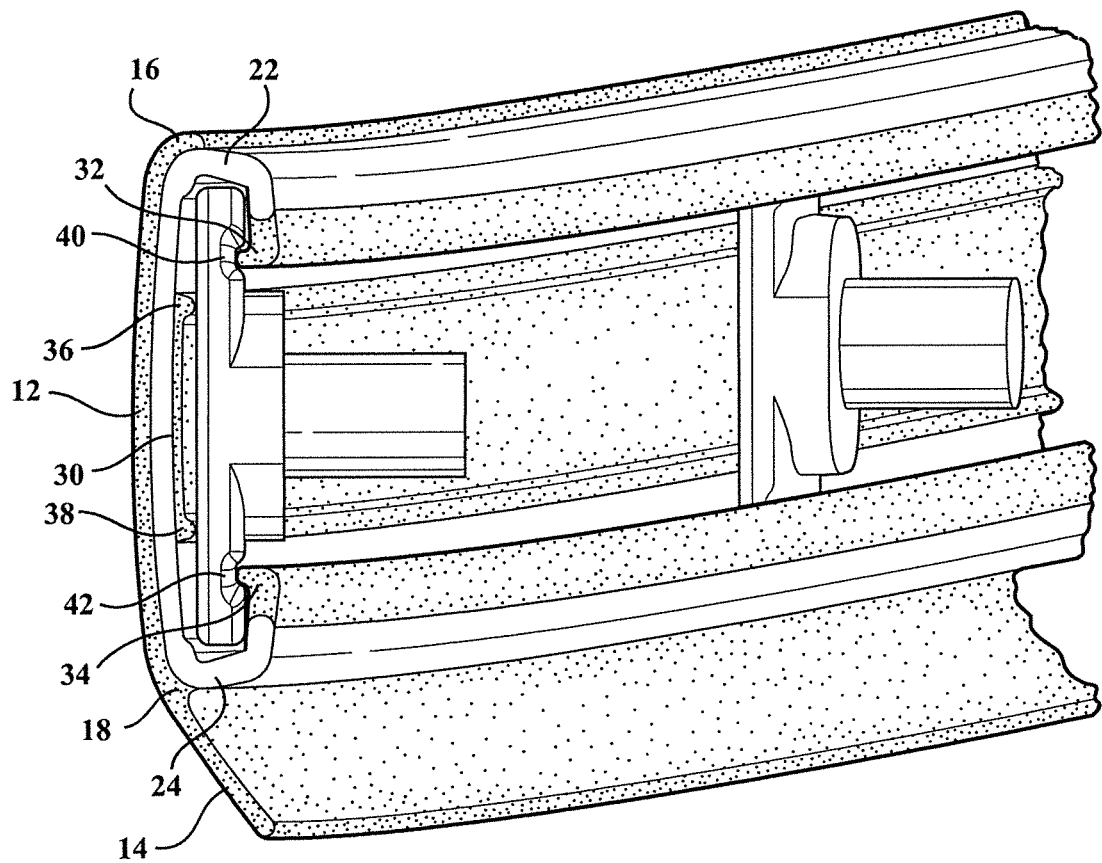
FIG. 5 is a successor view to FIG. 3 and illustrating the manner of installing the mounting fasteners in slidably inserting fashion via open ends of the track defining harder structural supporting portion.

As further best shown from the enlarged and cutaway side perspectives of FIGS. 2, 3 and 5, the exterior facing and softer material further includes, on an inner facing side, both an inwardly curled upper edge 16 and an inner protuberance defining the location of the angled lower lip 18. The inner facing side of the softer material between the upper edge 16 and lower lip defines a support surface against which is coextruded an inner and harder/structurally supporting thermoplastic component exhibiting a main body 20 and angled/curled upper 22 and lower 24 ends (see again FIGS. 2, 3 and 5), such that the structural supporting component defines a lengthwise extending track or channel for supporting a plurality of mounting fasteners.

Figure 4:
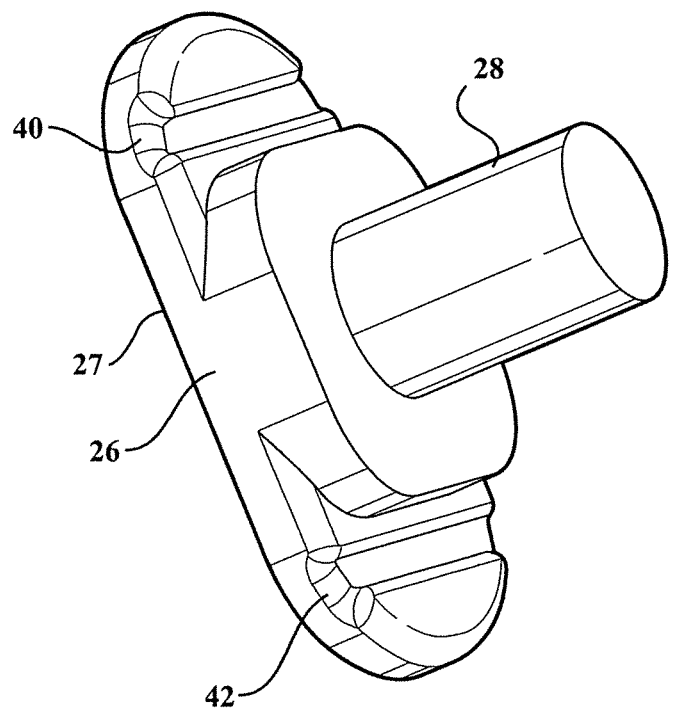
FIG. 4 is an enlarged perspective of a sample mounting fastener utilized with the roof ditch molding.
Figure 6:
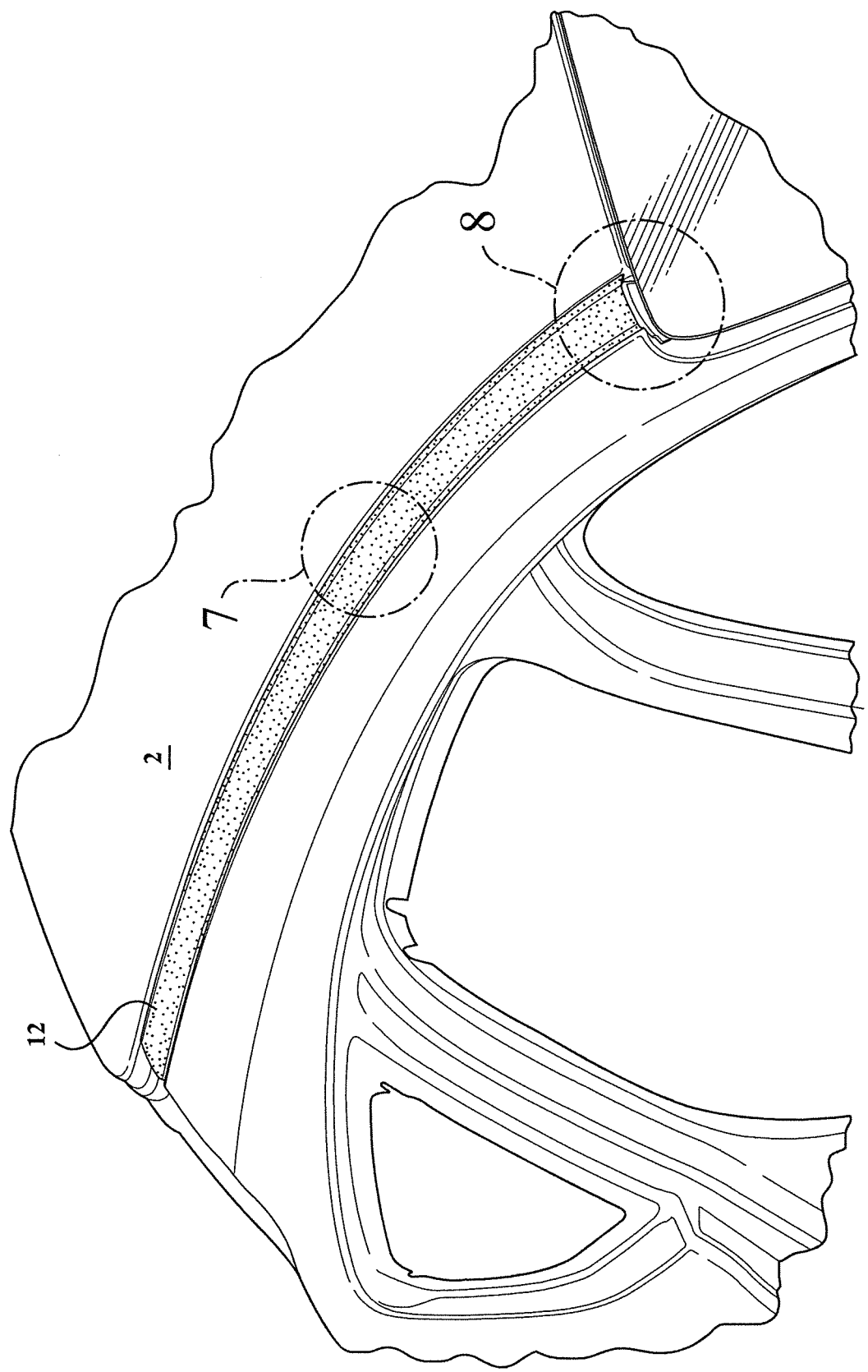
FIG. 6 is a first environmental view of the roof ditch molding installed along a vehicle roof edge.
Figure 7:
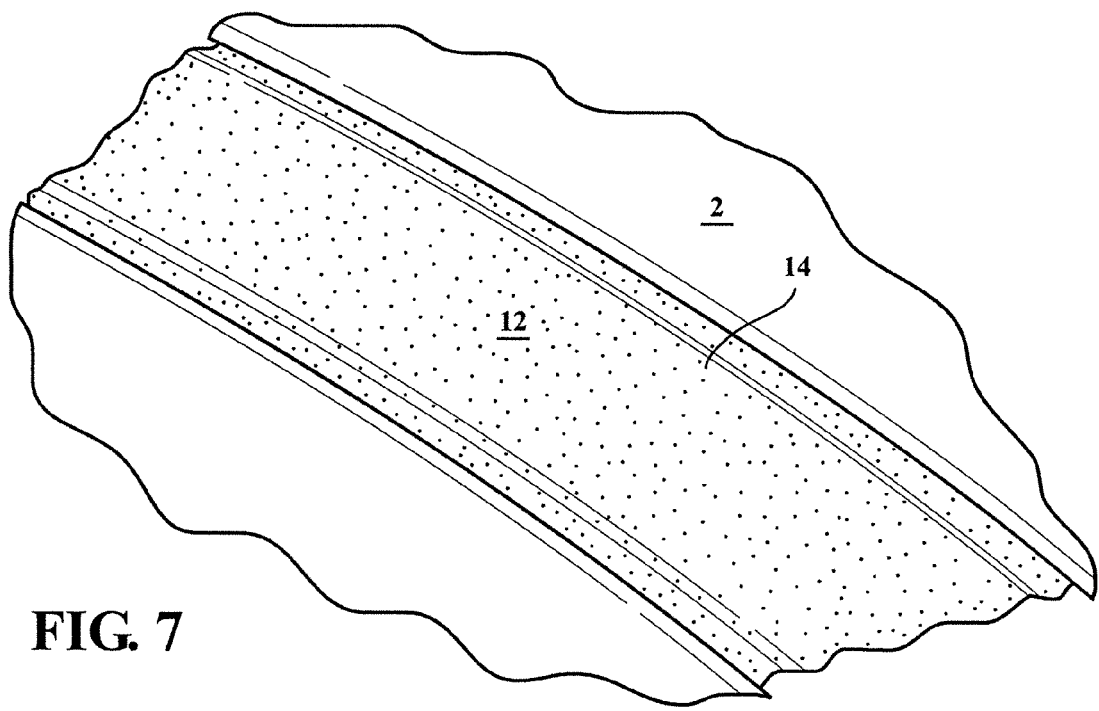
FIG. 7 is an enlarged view of an indicated intermediate portion of the roof ditch molding shown in FIG. 6.

Each of the fasteners, as best shown in FIG. 4, includes a main body 26 dimensioned to exhibit a flattened outer face (at 27 in FIG. 4) for seating in end-wise traversable fashion within the track defined in the structural supporting component. An inner stem 28 (again FIG. 4) associated with each fastener extends from the main body 26 and, in the inserted view of FIG. 1 as subsequently depicted by the installation views of FIGS. 6-8, secure within a recessed profile associated with a linear extending direction along a 2 of a vehicle, such as between a forward located windshield 4 and rearward window or pillar.

Referring again to enlarged FIGS. 3 and 5, also illustrated are additional softer plastic components coextruded along both the inside surface (at 30) and opposing/projecting edges (further at 32 and 34) of the track defining harder structural supporting portion. The component 30 defines a middle supporting surface extending along the interior of the main body 20 with upper 36 and lower 38 end protuberances for cushioning the rear planar surface 27 of the main fastener body 26.

The additional portions 32 and 34 are coextruded to the ends of the inwardly curled edges of the structural supporting ends 22 and 24, such that the additional softer components 30-38 provide cushioning support to the fasteners 26 when inserted into the track defined channels as best shown in FIG. 5. An inside surface of the track seating body 26 of each of the fasteners includes spaced apart and parallel configured recesses, see at 40 and 42 in FIG. 5, such that the softer inner angled portions 32 and 34 of FIG. 5 seat within the recesses 40 and 42 in a manner which facilitates a smooth and dynamic engagement of the extrusion within the roof ditch during the mounting process. The advantages of this construction include providing an additional degree of give or deflection (as further contributed by the inner surface coextruded softer supporting portions 36 and 38 acting upon the rear planar surfaces 27 of each fastener), thereby minimizing any misalignment during installation, as well as providing a solid fit and finish appearance.

Figure 8:
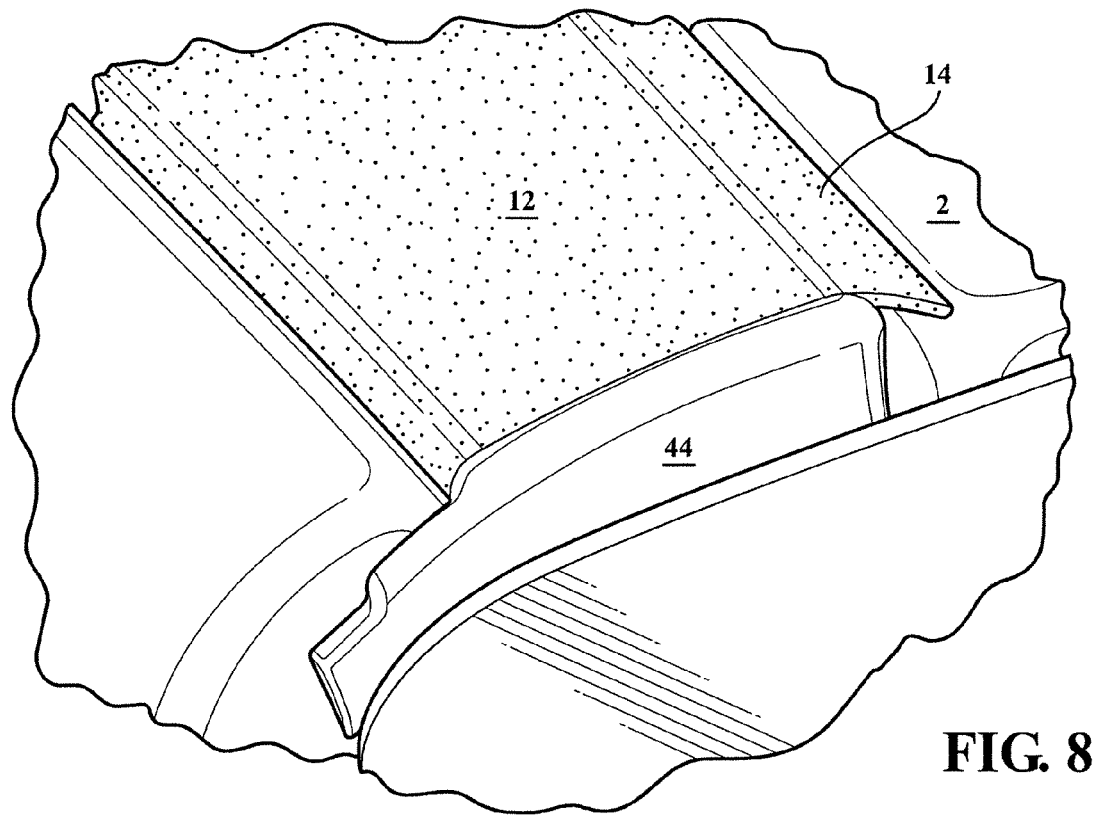
FIG. 8 is a further indicated and environmental corner perspective shown in FIG. 6 and further depicting a sealing cap for closing the inner track profile of the structural supporting portion.

Referring to FIG. 8, a further enlarged and environmental corner perspective is shown of the coextruded profile mounted within the vehicle roof ditch and which further depicts a sealing cap 44 for closing off each of the opposite ends of inner track profile of the structural supporting portion. Without limitation, the cap 44 can be mechanically affixed, heat staked or sonically welded to the ends of the coextruded profile following pre-assembly of a desired number of fasteners and concurrent with assembly to the vehicle roof ditch.

Figure 9:
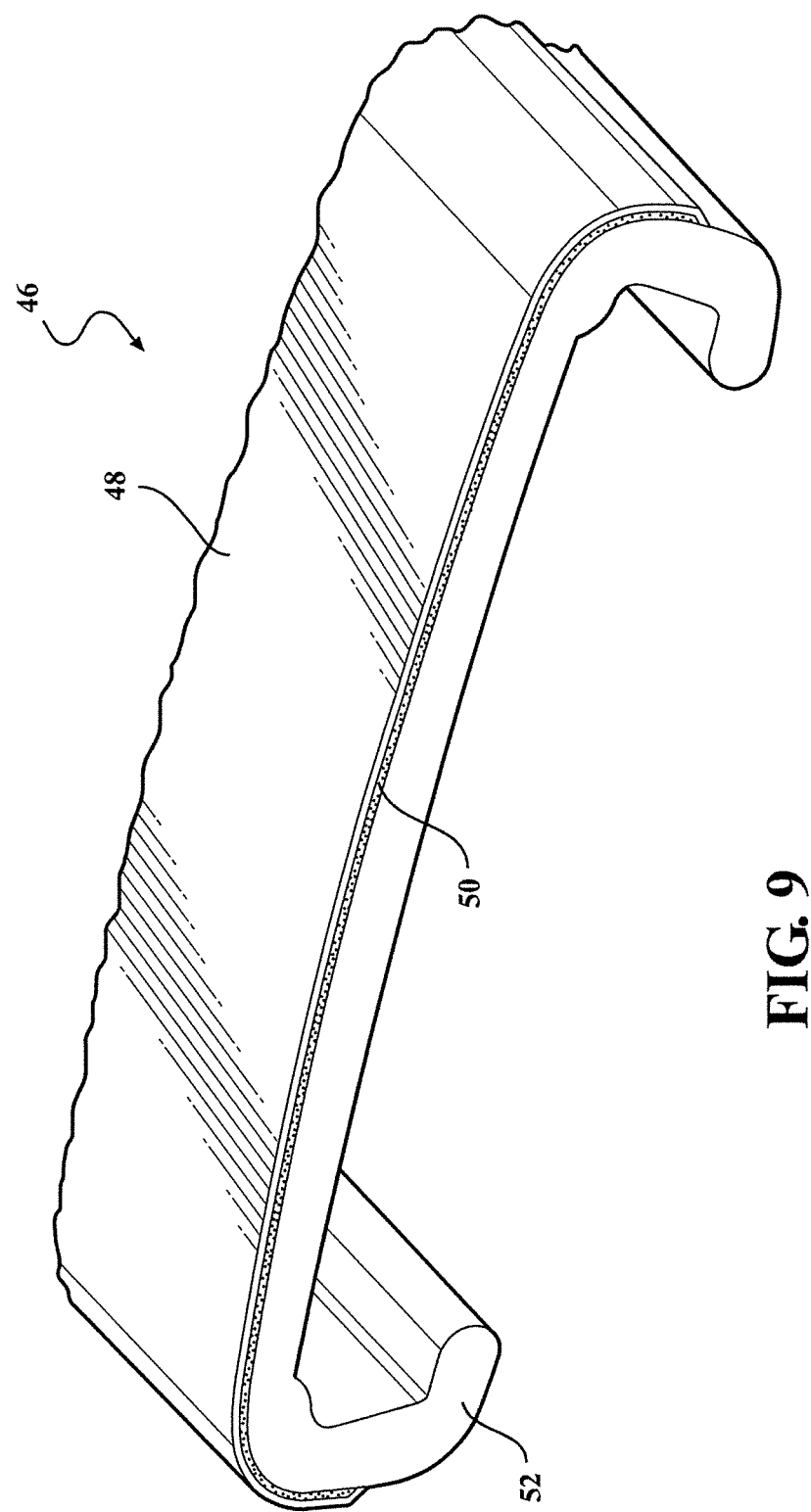
FIG. 9 is a partial perspective of a roof ditch molding according to a further variant and which exhibits a film material that may be applied upon a top surface of the second material defining the elongated body, and such as in order to provide any desired visual or reflective graphic.

Referring to FIG. 9, a partial perspective is generally depicted at 46 of a roof ditch molding according to a further variant and which exhibits a film material 48 that may be applied upon a top surface of a second (typically soft) material 50 which is molded over an initial hard or rigid material 52 (such as further according to any of the preceding described embodiments) for collectively defining the elongated body. The film material 48 in use provides any desired visual or reflective graphic appearance.

It is further envisioned that the film material 48 can be substituted with any other film, covering, coating or application not limited to that illustrated for purposes of providing any desired visual or decorative effect to the coextrusion. A transparent release film can optionally be provided without limitation over the main film covering.

Figure 10:
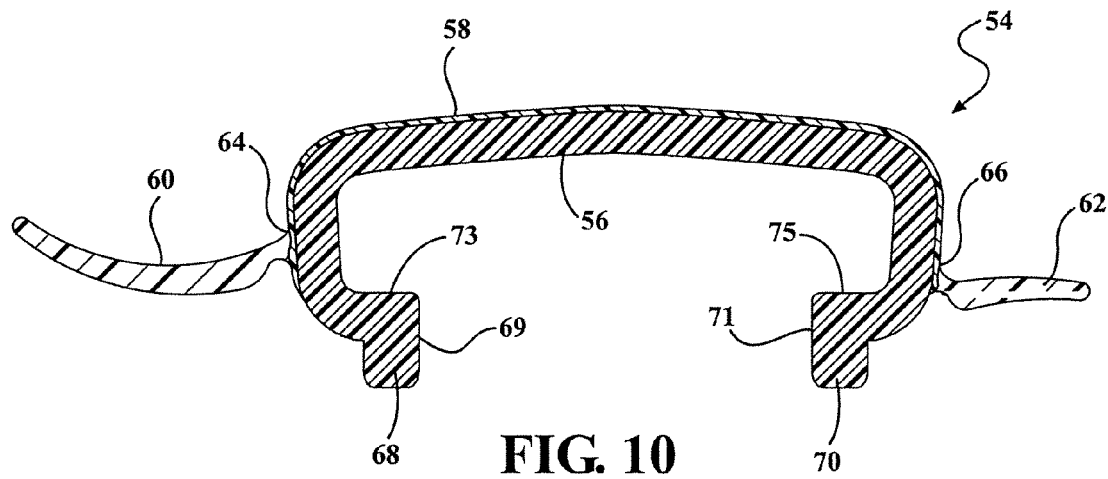
FIG. 10 is a cross section of a tri-extruded roof ditch molding according to a further preferred embodiment of the present inventions.

Referring now to FIG. 10, a cross section of a tri-extruded roof ditch molding is generally shown at 54 according to a further preferred embodiment of the present inventions. As will be described with reference to the succeeding illustrations of FIGS. 11-18, the tri-extruded molding is produced as an elongated trim defining component and is constructed of a rigid substrate material 56. A first UV graded thermoplastic elastomer 58 (or thermal plastic vulcanizate) is applied over the exterior of the rigid substrate 56, with a second thermoplastic elastomer formed as a pair of laterally projecting wings 60 and 62 (also termed soft wipers) along exterior and outwardly opposite edges of the rigid substrate and in communicating fashion with the jointly extruded edges, further at 64 and 66 of the first thermoplastic elastomer 58.

Figure 11:
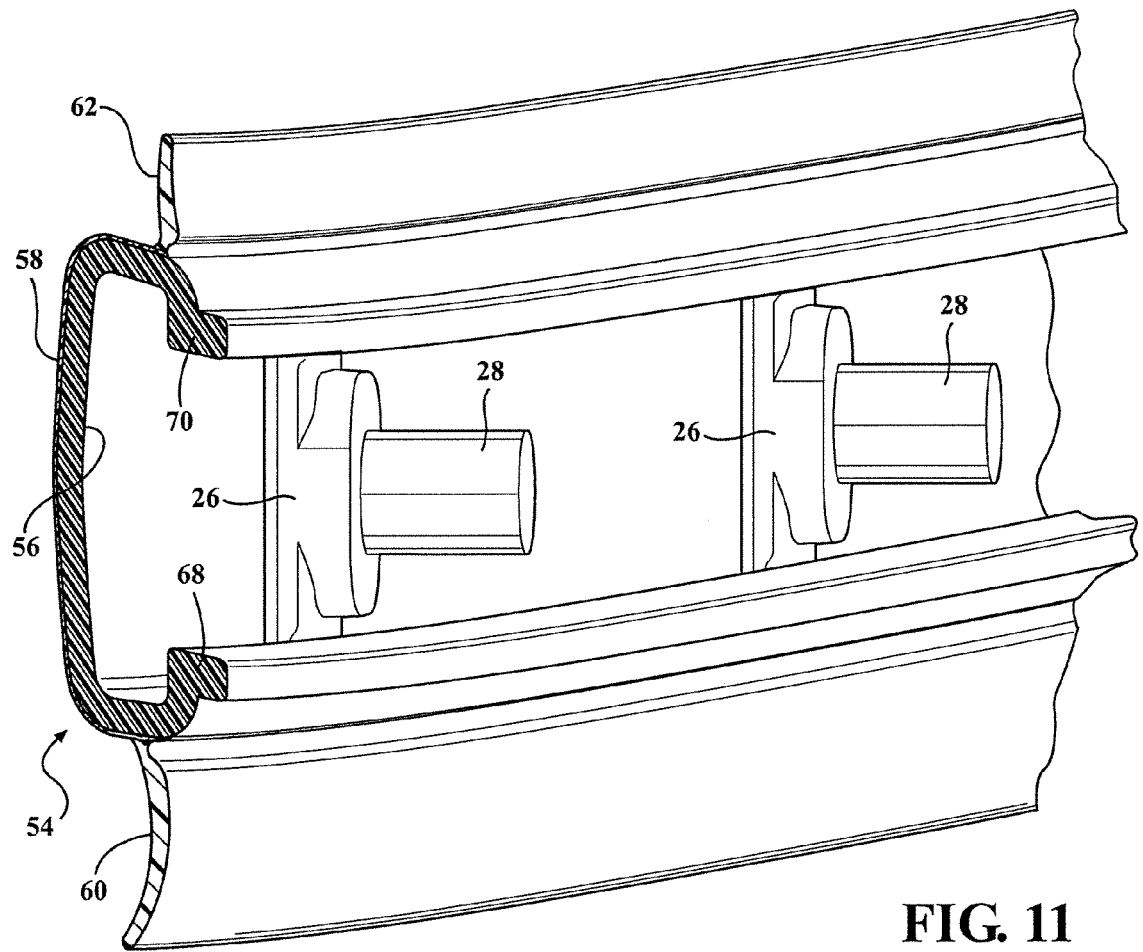
FIG. 11 is an illustration similar to FIG. 5 of the tri-extruded roof ditch molding according to the further preferred embodiment and exhibiting one previously described variant of mounting fastener mounted in installed fashion within an interior track defined by the substantially "C" cross sectional profile of the substrate material.

The rigid substrate (structurally supporting) component 56 can be provided as any one of a number of materials including, without limitation, an ultra-fine talc reinforced polypropylene (PP). The substrate 56 exhibits a generally "C" shape terminating at either of inwardly or, as shown in FIGS. 10-11, downwardly angled ends 68 and 70 (also termed as stiffness increasing ribs) and so as to define an extending track within which a plurality of fasteners 26 (see as previously described in FIG. 4) seat for mounting the molding to the vehicle roof ditch. As further clearly shown in FIG. 10, the angled ends 68 and 70 each exhibit inner vertical surfaces (at 69 for end 68 and further at 71 for end 70), as well as underside horizontal surfaces (at 73 for end 68 and further at 75 for end 70). The pairs of surfaces 69/73 and 71/75 are separated by curved edges and, as shown, are each arranged at a substantially perpendicular angle to facilitate receiving the mounting fasteners 26 in the manner previously described and again best depicted in FIG. 11.

The elastomer components 58, 60 and 62 which are tri-extruded with the rigid substrate 56 can further exhibit different properties including being UV graded to exhibit high definition color on its exterior surfaces. Other features include application of any film material over exposed surfaces associated with components.

Figure 16:
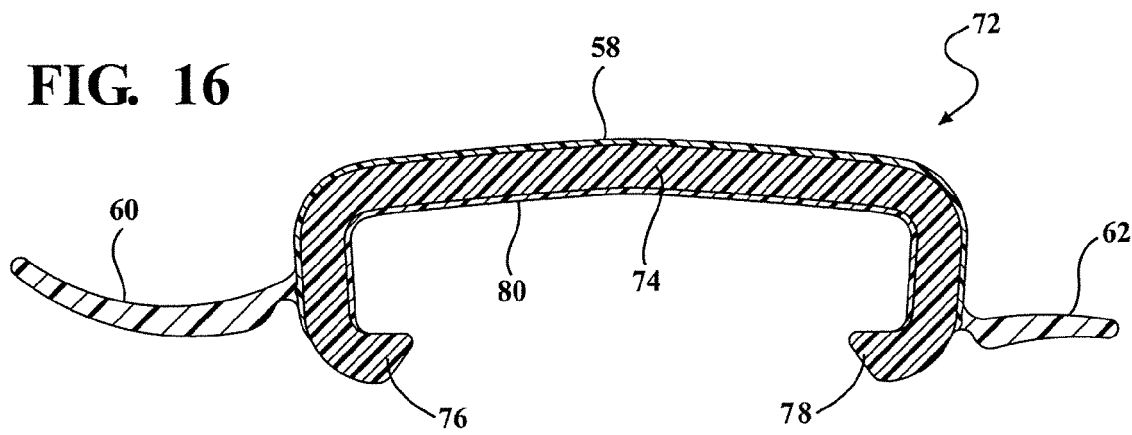
FIG. 16 is an illustration similar to FIG. 10 of a modified tri-extruded roof ditch molding exhibiting a different substrate profile and exhibiting an additionally extruded inner coating of a thermoplastic elastomer.

FIG. 11 is an illustration similar to that previously shown and described in FIG. 5 of the tri-extruded roof ditch molding according to the further preferred embodiment 54 and exhibiting the previously described variant of mounting fastener 26 mounted in installed fashion within an interior track defined by the substantially "C" cross sectional profile of the substrate material 56. FIG. 16 is an illustration similar to FIG. 10 of a modified tri-extruded roof ditch molding, see generally at 72 exhibiting a different substrate profile 74 with inwardly angled ends 76 and 78.

The modified molding 72 includes elastomer components 58, 60 and 62 as previously described and additionally exhibits an extruded inner coating 80 of a thermoplastic elastomer material. It is understood that the configuration and shape of any of the extruded substrate as well as the laterally projecting wings/wipers 60 and 62 can be reconfigured as desired to correspond to the mating profile of the associated vehicle roof ditch within and along which it is installed.

FIG. 17 is a perspective illustration of an end portion 82 of a completed molding such as described above with attached end caps, see configured end portions at 84, as well as providing reconfigured fasteners, further shown at 86, for mounting into the vehicle roof ditch (not shown). FIG. 18 is a rotated inside view of the roof ditch molding and fastener construction of FIG. 17 and further depicting a pair of the reconfigured fasteners 86 arranged in channel supported and spaced apart fashion in order to mount the tri-extruded molding 82 to the roof ditch. Although not shown, this can include reconfiguring the channel interior of the roof ditch in order to exhibit seating locations for biasingly engaging clip extending locations, these illustrated as pairs of outwardly and oppositely extending clips at 88/90 and 92/94 associated with the fastener 86.

Figure 12:
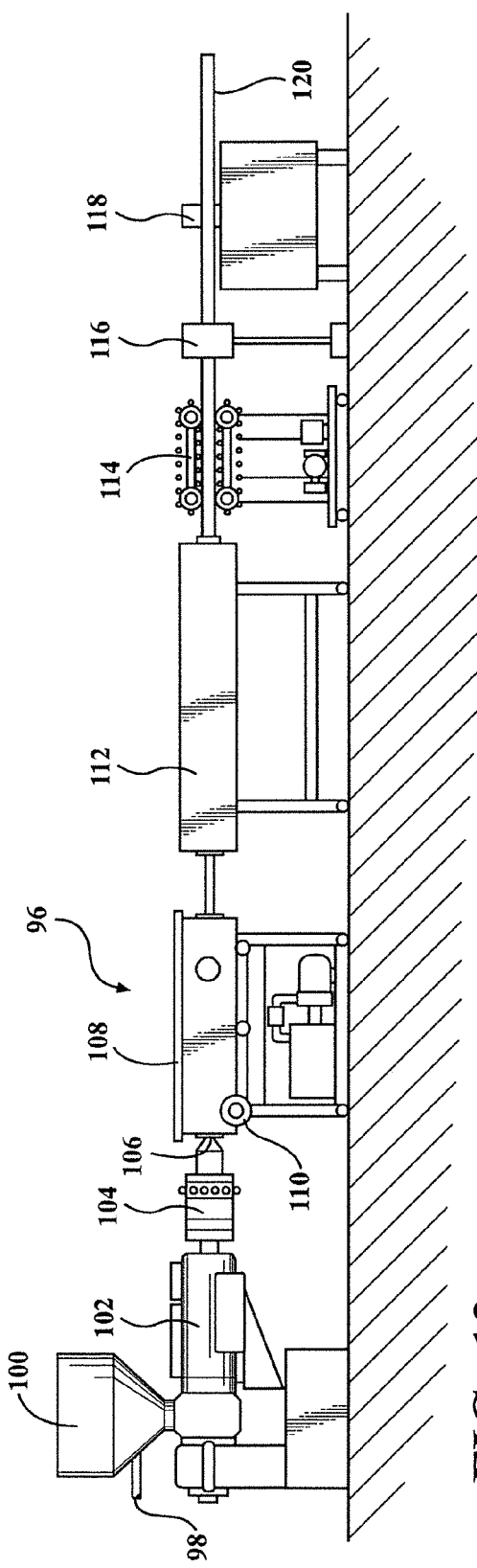
FIG. 12 is a system layout of the tri-extrusion manufacturing process for forming the extrusion.

Referring to FIG. 12, a system layout is generally shown at 96 of production line process for forming a tri-extruding article incorporating the three components previously described in FIGS. 10, 11 and 16-18 into a roof ditch molding. Illustrated at 98 is an input location from a dryer (not shown) which is communicated with a pellet material supply inlet or hopper 100 forming a portion of a multi-component extrusion machine (the input supply 100 intended to generally represent multiple inputs for delivery both the rigid polypropylene based material forming the substrate as well as the softer thermoplastic elastomer materials).

Extruders 102 output the initially formed materials to one or more dies, also generally depicted at 104, communicating further to a sizing plate or sleeve 106 feeding an input of a vacuum-sizing chamber 108 for assisting in forming the multi-extruded article according to the desired dimensions. A rack and spur gear positioning adjustment assembly 110 is incorporated into the vacuum-sizing chamber 108 to assist in properly combining and forming the individual materials in the desired tri-extruded arrangement.

Succeeding steps include a water cooling bath 112 through which the tri-extruded and hot continuous article is conveyed. A pullout assembly 114 provides for measured drawing or extraction of the cooled tri extrusion which is then communicated to a reheat section 116 and cutting unit 118, with the sectioned lengths of extrusion being advanced thereafter to a suitable handling or bending operation 120.

Figure 13:
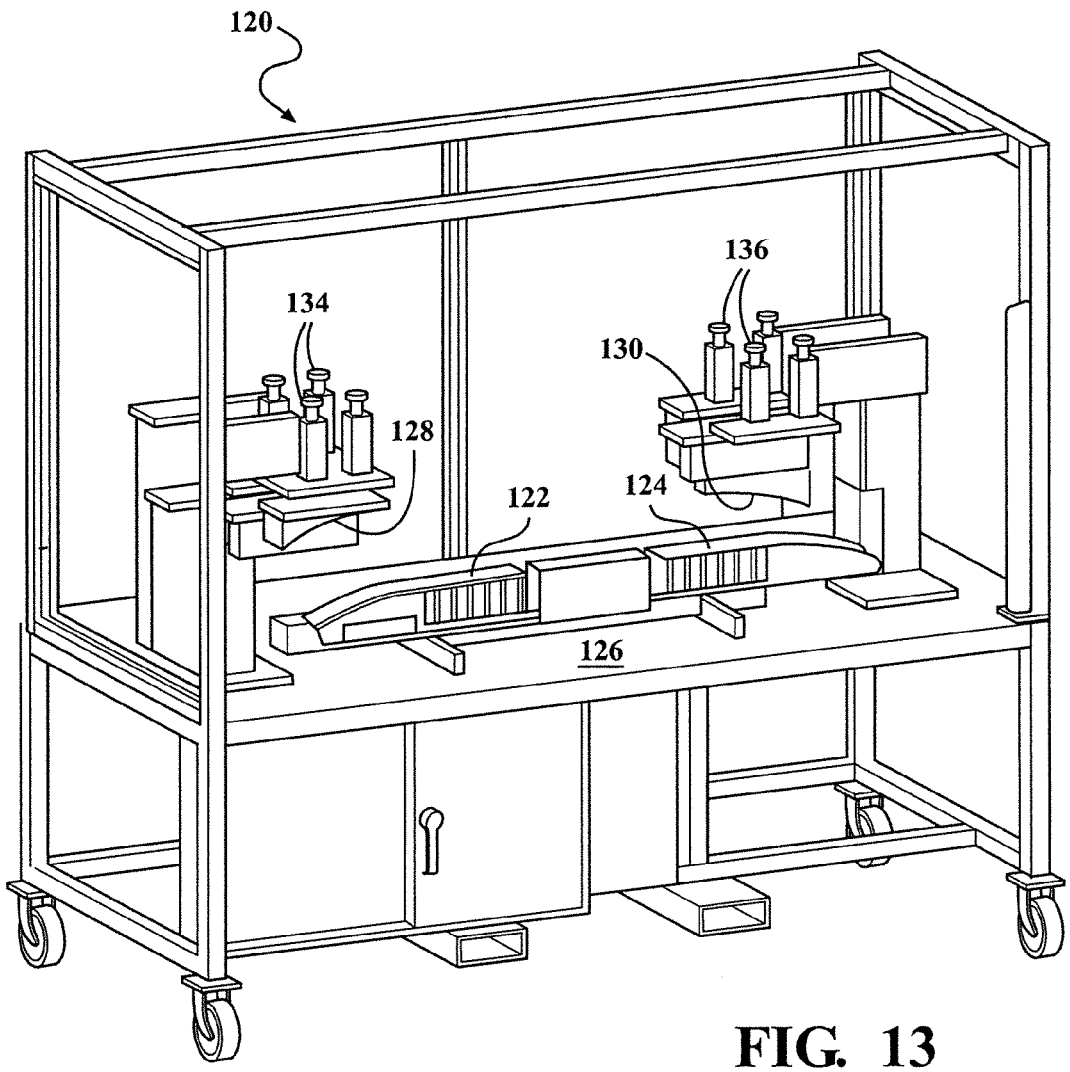
FIG. 13 is an illustration of an extrusion handling/bending operation succeeding the process system of FIG. 12.

FIG. 13 is an illustration of one non-limiting example of an extrusion handling/bending operation, again at 120, succeeding the process system of FIG. 12. The desired angled or contoured profile of the roof ditch molding produced by the extrusion process of FIG. 12 is accomplished by bending or conforming the elongated and tri-extruded article upon die surfaces 122 and 124 supported upon platform 126.

Figure 14:
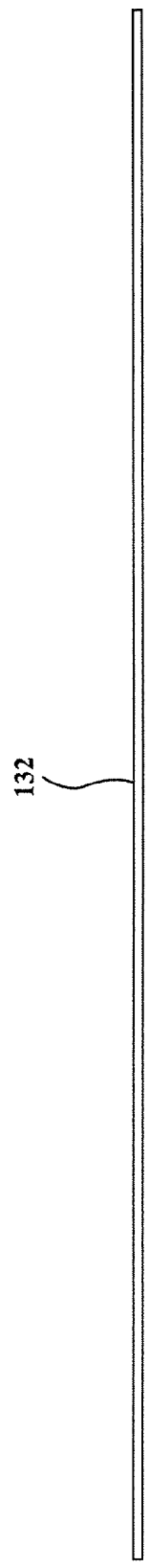
FIG. 14 is a pre-bent illustration of a tri-extruded roof ditch molding formed according to the present system and process.
Figure 15:
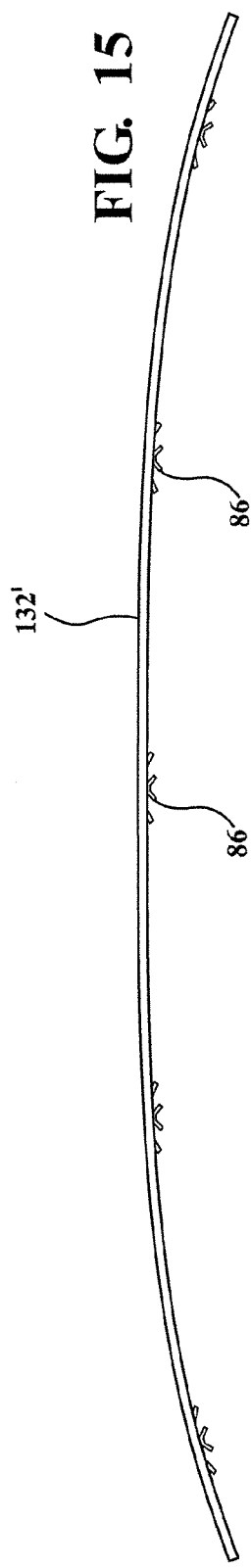
FIG. 15 is a succeeding bent illustration of the roof ditch molding shown in FIG. 14 produced by the post forming and handling operation of FIG. 13.

Additional compression dies 128 and 130 are provided and, upon initially feeding a flat length of tri-extruded article, shown at 132 in FIG. 14, in supporting fashion over the lower die surfaces 122/124, the upper positioned dies 128/130 are actuated by the controlling servo motors 134 and 136 into contact with the article 132 in a progressive loading/bending operation in order to reconfigure the extrusion article into the bent profile 132' of FIG. 15, such as further including the installation of suitable roof ditch engaging fasteners as again shown at 86. Bending of the extruded article within the assembly 120 can include incorporating any combination of infrared (IR) heat, superheated or cold air, and modified pressure (such as which is also associated with the pressurized environment within either of the original tri-extruding process as reflected by the vacuum sizing chamber 108 and the succeeding forming/bending step depicted by handling operation 120).

As previously described, the assembly and process for creating the tri-extruded article enables the production of a 100% thermoplastic design exhibiting the desired appearance of a metal substrate or metal coated article, this further assisted by the UV exterior grade TPV seals and coatings for providing the thermoplastic article with a desired colorization scheme and texture mimicking that of other materials including high definition (faux metal) painted trim.

The present invention also contemplates production of multi-extruded articles not limited to that described herein and which can also include any number of extruded portions combined into any desired shape or configuration for any application not limited to the roof ditch variants described herein. Along these lines, a further variant of tri-extrusion can include only one of the pair of wings or wipers shown at 60 and 62, or can be further redesigned to provide the pair in a different configuration than that shown.

Having described my invention, other and additional preferred embodiments will become apparent to those skilled in the art to which it pertains, and without deviating from the scope of the appended claims.

We claim:

1. A multi-component extruded article for mounting to a vehicle location, comprising:
   a rigid substrate constructed from a first material and exhibiting a "C" shape in cross section having an underside channel adapted to receive a plurality of fasteners in inserted fashion, said rigid substrate further having in cross section end most extending ribs;
   a first thermoplastic elastomer coating jointly extruded over at least a portion of an exterior surface of said rigid substrate; and
   a second thermoplastic elastomer likewise extruded along at least one additional edge location of said rigid substrate in contact with said first elastomer in order to define a wing laterally projecting from the first thermoplastic elastomer when viewed in crosswise profile, said second thermoplastic elastomer further including first and second opposite extending wings in contact with jointly extruded edges of said rigid substrate and said first thermoplastic elastomer.

2. The extruded article as described in claim 1, said rigid substrate further comprising an talc reinforced polypropylene.

3. The extruded article as described in claim 1, at least one of said first and second thermoplastic elastomers further comprising a UV grade thermo plastic vulcanizate coating.

4. The extruded article as described in claim 3, said coating further comprising a high definition color component.

5. The extruded article as described in claim 1, further comprising end caps for closing off each of opposite ends of an inner track profile established by the structurally supporting material.

6. The extruded article as described in claim 1, said fasteners each further comprising a main body dimensioned to exhibit a flattened outer face for seating in end-wise traversable fashion within said channel, an inner stem extending from said main body and which is adapted to secure within a recessed profile associated with a linear extending direction along the vehicle between a forward located windshield and rearward window or pillar.

7. The extruded article as described in claim 1, said fasteners each further comprising at least one pair of oppositely extending clips adapted to secure within a recessed profile associated with a linear extending direction along the vehicle between a forward located windshield and rearward window or pillar.

8. A tri-extruded article for mounting within a vehicle roof ditch, comprising:
   a rigid substrate constructed from a first material and exhibiting in cross section a channel adapted to receive a plurality of fasteners in inserted fashion, said rigid substrate further comprising in cross section end most extending ribs having inner angled ends with vertical surfaces and underside horizontal surfaces arranged at substantially a 90° angle to facilitate receiving said fasteners within said channel;
   a first thermoplastic elastomer coating jointly extruded over at least a portion of an exterior surface of said rigid substrate; and
   a second thermoplastic elastomer likewise extruded along opposite edge locations of said rigid substrate in contact with and over said first elastomer, said second elastomer including a pair of wings laterally projecting from said first thermoplastic elastomer when viewed in crosswise profile, at least one of said first and second thermoplastic elastomers further comprising a UV grade thermo plastic vulcanizate coating.

9. The extruded article as described in claim 8, said ribs extending in angled fashion relative to joining locations defining a portion of a "C" shape cross sectional profile defined by said substrate.

10. The extruded article as described in claim 8, said rigid substrate further comprising an talc reinforced polypropylene.

11. The extruded article as described in claim 8, said coating further comprising a high definition color component.

12. The extruded article as described in claim 8, further comprising end caps for closing off each of opposite ends of an inner track profile established by the structurally supporting material.

13. The extruded article as described in claim 8, said fasteners each further comprising a main body dimensioned to exhibit a flattened outer face for seating in end-wise traversable fashion within said channel, an inner stem extending from said main body and which is adapted to secure within a recessed profile associated with a linear extending direction along the vehicle between a forward located windshield and rearward window or pillar.

14. The extruded article as described in claim 8, said fasteners each further comprising at least one pair of oppositely extending clips adapted to secure within a recessed profile associated with a linear extending direction along the vehicle between a forward located windshield and rearward window or pillar.

* * * * *